(12) United States Patent
Dubedout et al.

(10) Patent No.: US 8,042,842 B2
(45) Date of Patent: Oct. 25, 2011

(54) PRODUCTION BY PLASTIC EXPANSION OF A SEALED TUBULAR JOINT WITH INCLINED ABUTTING SURFACE(S)

(75) Inventors: Laurent Dubedout, Valenciennes (FR); Benoit Duquesne, Valenciennes (FR); Eric Verger, Valenciennes (FR); Gregory Molins, Valenciennes (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 1300 days.

(21) Appl. No.: 10/580,718

(22) PCT Filed: Nov. 22, 2004

(86) PCT No.: PCT/FR2004/002971
§ 371 (c)(1),
(2), (4) Date: Dec. 19, 2006

(87) PCT Pub. No.: WO2005/064217
PCT Pub. Date: Jul. 14, 2005

(65) Prior Publication Data
US 2007/0102927 A1      May 10, 2007

(30) Foreign Application Priority Data

Nov. 28, 2003   (FR) ..................................... 03 14038
Sep. 22, 2004   (FR) ..................................... 04 10007

(51) Int. Cl.
*F16L 13/14*   (2006.01)
*F16L 15/00*   (2006.01)
(52) U.S. Cl. .................... 285/382.4; 285/382.2; 285/334
(58) Field of Classification Search .................. 285/333, 285/334, 382, 382.1, 382.2, 382.4, 382.5, 285/390
See application file for complete search history.

(56) References Cited

U.S. PATENT DOCUMENTS

| 4,611,838 A | 9/1986 | Heilmann et al. |
| 5,154,452 A | 10/1992 | Johnson |

(Continued)

FOREIGN PATENT DOCUMENTS

EP    488912 A2 *   6/1992

(Continued)

OTHER PUBLICATIONS

U.S. Appl. No. 10/580,607, filed May 25, 2006, Dubedout, et al.

(Continued)

*Primary Examiner* — James Hewitt
(74) *Attorney, Agent, or Firm* — Oblon, Spivak, McClelland, Maier & Neustadt, L.L.P.

(57) ABSTRACT

A tubular joint, with a first male tubular element, with a male thread, a first annular lip, with a first axial abutting surface, a first internal surface, a section of a first external surface, a second abutting surface and a second female tubular element, with a female thread, matching the male thread, a second annular lip, with a third abutting surface, a second external surface, arranged to face the first internal surface, a second internal surface and a fourth axial abutting surface, supporting the first abutting surface and defining, in particular with the second external surface, an annular housing, matching the first lip. The second and third abutting surfaces being conical with effectively identical inclines and which permit generating a first radial sealing contact of the first internal surface or external surface against the second external surface, or the third internal surface, and, with expansion, provides a second sealing contact.

45 Claims, 5 Drawing Sheets

U.S. PATENT DOCUMENTS

Figure 3:
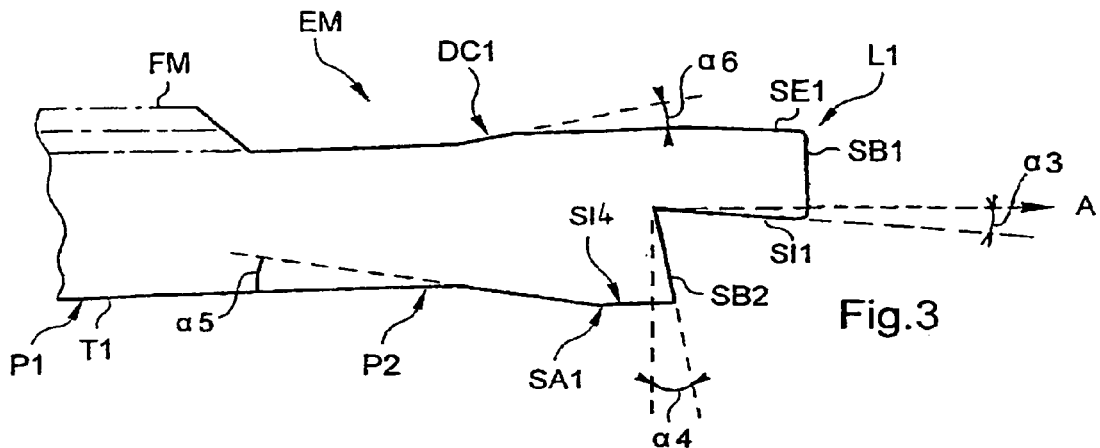

| | | | |
|---|---|---|---|
| 5,681,059 A * | 10/1997 | Mackie | 285/94 |
| 5,765,836 A | 6/1998 | Banker et al. | |
| 5,964,486 A * | 10/1999 | Sinclair | 285/331 |
| 6,047,997 A | 4/2000 | Olivier | |
| 6,322,110 B1 | 11/2001 | Banker et al. | |
| 6,457,532 B1 * | 10/2002 | Simpson | 166/380 |
| 6,478,344 B2 * | 11/2002 | Pallini et al. | 285/333 |
| 6,604,763 B1 * | 8/2003 | Cook et al. | 285/355 |
| 6,712,401 B2 * | 3/2004 | Coulon et al. | 285/331 |
| 6,722,443 B1 * | 4/2004 | Metcalfe | 166/384 |
| 6,752,436 B1 * | 6/2004 | Verdillon | 285/333 |
| 6,905,150 B2 * | 6/2005 | Carcagno et al. | 285/334 |
| 2002/0021006 A1 | 2/2002 | Mallis | |
| 2002/0139540 A1 * | 10/2002 | Lauritzen | 166/387 |
| 2002/0163192 A1 | 11/2002 | Coulon et al. | |
| 2004/0262919 A1 * | 12/2004 | Dutilleul et al. | 285/333 |
| 2005/0087983 A1 * | 4/2005 | Verger et al. | 285/333 |
| 2005/0172472 A1 | 8/2005 | Verger et al. | |
| 2005/0212290 A1 * | 9/2005 | Durand et al. | 285/333 |
| 2007/0102927 A1 * | 5/2007 | Dubedout et al. | 285/382 |

FOREIGN PATENT DOCUMENTS

| | | |
|---|---|---|
| FR | 2 844 330 | 3/2004 |
| WO | WO 85/02651 | 6/1985 |
| WO | WO 00/66928 | 11/2000 |
| WO | WO 02/01102 A1 | 1/2002 |
| WO | WO 02/095181 A1 | 11/2002 |
| WO | 03/060370 | 7/2003 |

OTHER PUBLICATIONS

U.S. Appl. No. 10/580,585, filed May 25, 2006, Dubedout, et al.

* cited by examiner

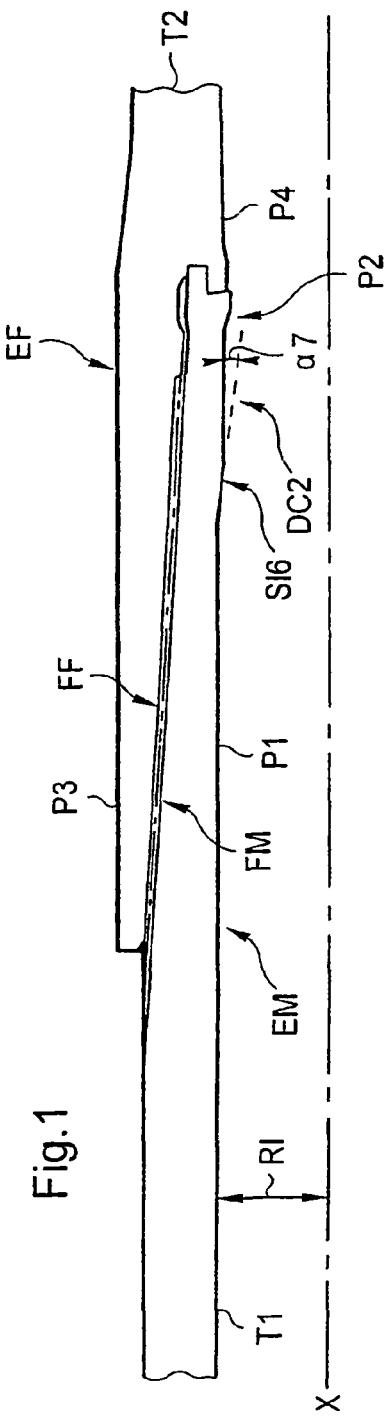
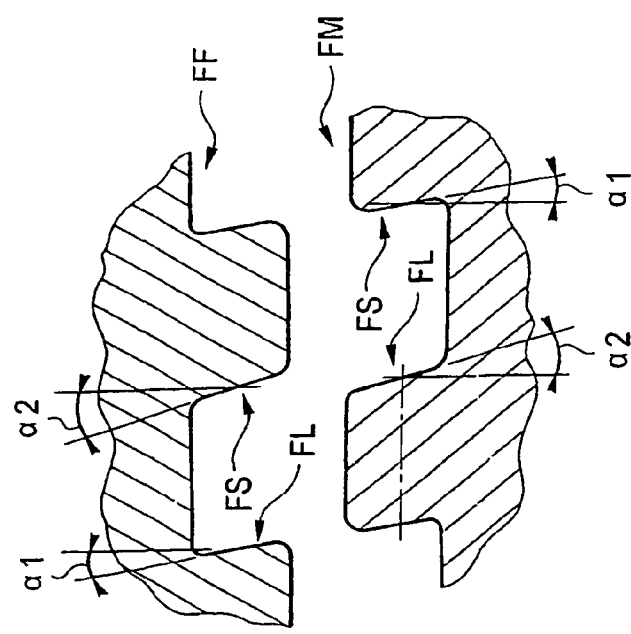

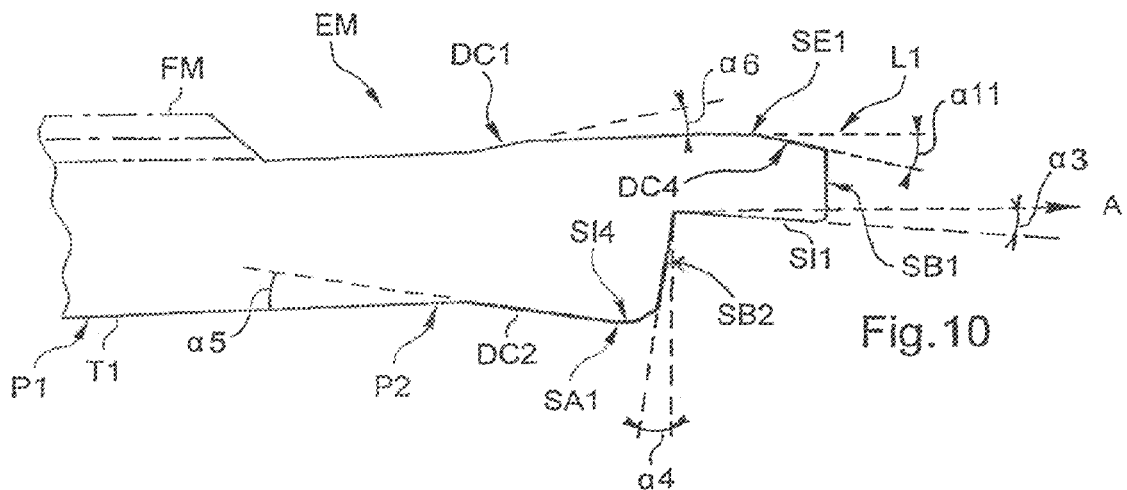
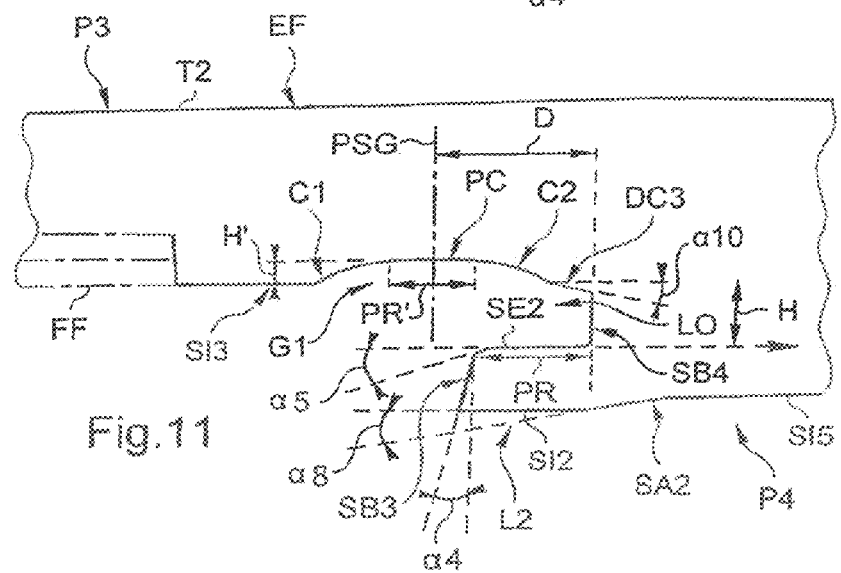
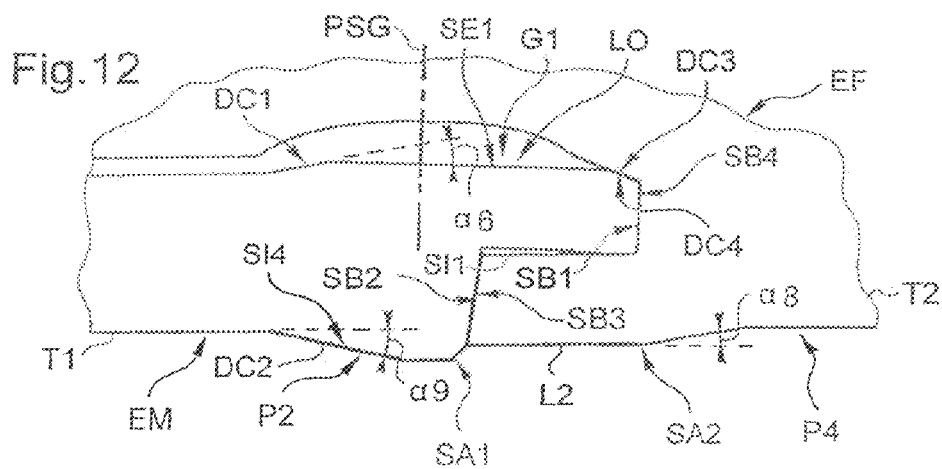

PRODUCTION BY PLASTIC EXPANSION OF A SEALED TUBULAR JOINT WITH INCLINED ABUTTING SURFACE(S)

The invention relates to the field of tubular joints such as, for example, those used in hydrocarbon wells or similar wells, such as geothermal wells.

These joints are generally used to connect great length tubes together, or to connect great length tubes and sleeves together. They thus allow casing or tubing strings to be formed.

Moreover, these joints must be able to withstand large bending, tensile, compressive and sometimes torsional stresses, and also considerable pressure variations between the interior and the exterior. Furthermore, these joints must also in some cases be gas-tight. For these reasons, the joints are often of the threaded type and the sleeves and tubes are generally made from steel or from an alloy having a high yield point (possibly obtained by heat treatment). In the case of threaded joints, gas-tightness is most often provided by sealing surfaces with interfering "metal-on-metal" type contact.

In order to reduce the initial overall size of the tubes and also possibly to allow the drilling of wells having a uniform diameter, it has been proposed, in particular in documents U.S. Pat. No. 6,604,763 and WO 03/071086, forcefully to expand them diametrally in situ by means of an expansion tool known as a "ball". Sealed threaded joints such as for example, those described in document EP 0488912 are able to withstand such expansion but lose their sealing characteristics during the expansion, the nose at the end of the male element, which carries a male sealing surface, falling toward the axis during the expansion ("banana" effect), and this breaks the seal.

In order to solve this problem, the Applicant proposed, in document WO 02/01102, a threaded tubular joint, the male nose of which is provided at one end with an annular finger fitted in a female groove, the groove providing support for the finger and preventing the male finger from falling toward the axis during the expansion.

However, a threaded joint of this type does not have sufficiently high sealing characteristics when the expansion rate is greater than 10%. The deformations generated by the expansion ball displace, or even eliminate, the contacts between the male finger and the groove, and this displaces the interference contacts between sealing surfaces by reducing or even eliminating them.

The term "interference contact" refers, in the present context, to a contact developing a contact pressure between two contacting surfaces. The higher the contact pressure, the higher the fluid pressure the joint is able to withstand without the seal being broken. In addition to the fluid pressure, which may be exerted inside or outside the threaded joint axial tensile or compressive loads may modify the contact pressure and therefore the sealing characteristics. In other words, owing to the embodiment of these joints, their seal may not be identical with respect to the internal pressure or the external pressure, nor be stable as a function of the load.

In order to improve the situation, the Applicant proposed, in patent document FR 02/03842 (filed on 27 Mar. 2002 under the internal priority of patent document FR 02/00055, filed on 3 Jan. 2002), a metal/metal tubular sealing joint provided with an annular finger (or lip) described in document WO 02/01102 and having inclined male and female shoulders, highly tightened against one another after expansion, the shoulder on the female element consisting of the flank of a groove and the shoulder on the male element being able to pre-exist or result from the pressing of the male element at the bottom of the groove during the expansion.

This joint was configured to provide a seal at high expansion rates, typically greater than 10%, but its sealing characteristics prior to and after expansion may prove insufficient if the sealing characteristics required in the various forms of loading are high.

The object of the invention is therefore to improve the situation, in particular in terms of the tightness to liquids under high pressure prior to expansion and the stability of the tightness to high-pressure gases, prior to and after expansion, for the various forms of loading.

The invention therefore proposes an expandable tubular joint comprising:
- a first tubular element comprising, on the one hand, a first portion provided with a male thread and, on the other hand, a second portion extending the first portion and comprising i) a first outer surface, ii) a first annular lip having a first axial abutment surface and a first inner surface and delimited by said first outer surface over a portion of the axial length thereof, and iii) a second abutment surface,
- a second tubular element comprising, firstly, a female thread, matching the male thread and screwed thereto, secondly, a second annular lip having a third abutment surface resting against the second abutment surface, a second outer surface, arranged to face the first inner surface and a second inner surface, thirdly, a fourth axial abutment surface, and fourthly, a third inner surface extending between the fourth axial abutment surface and the female thread and defining with the second outer surface and fourth abutment surface an annular recess matching the first lip.

This joint is characterised by the fact that the second and third abutment surfaces are conical surfaces having substantially identical angles of inclination relative to a plane transverse to a longitudinal direction, selected so as to press the second abutment surface against the third abutment surface in order to generate a first radial and sealing interference contact of one of the first inner and outer surfaces of the first lip against the second outer surface or the third inner surface respectively, and such that, during a diametral expansion in the plastic deformation region subsequently carried out on the expandable tubular joint, the first outer surface and the third inner surface are forced locally to define a second sealing interference contact.

A high-quality seal is thus produced by cooperation of the first and second lips, both prior to and after expansion, even for high diametral expansion rates (up to approximately 35%).

The expandable joint according to the invention may comprise other characteristics which may be taken individually or in combination, in particular:
- the first lip and the recess may initially have shapes selected such that the first interference contact is not generated until the second abutment surface rests on the third abutment surface.
- the inclinations of the second and third abutment surfaces may initially be between approximately +5° and approximately +30°,
- the curvature of the first lip in the direction of the longitudinal axis of the joint during the expansion allows a supplementary sealing interference contact to be defined between their first inner surface and second outer surface after expansion, the first abutment surface may be arranged so as to rest against the fourth abutment surface and thus cause the first lip to be subjected to axial compression in the elastic deformation region.

the second lip may comprise a second outer surface initially having, in the region of its connection to the third abutment surface, an annular portion inclined relative to the longitudinal direction by any angle of between approximately 8° and approximately 12°, and preferably equal to approximately 10°, the first lip may comprise a first inner surface initially inclined relative to the longitudinal direction by an angle of between approximately 0.1° and approximately 15°, the ratio between the extension of the second lip in the longitudinal direction and the extension of the recess in the transverse direction may be between approximately 1 and approximately 3, and preferably between approximately 1.2 and approximately 1.6, the male and female threads may comprise threads provided with a carrier flank having a negative angle of between approximately −3° and approximately −15°, the male and female threads may comprise threads provided with a stabbing flank having a positive angle of between approximately +10° and approximately +30°; in this case, the male and female threads may have, after screwing and prior to expansion, an axial clearance between their stabbing flanks of between approximately 0.05 mm and approximately 0.3 mm, the first tubular element may initially have, in the region of its first outer surface and before its first portion, a conical chamfer defining a first local annular set-back toward the interior, toward the first portion; in this case, the chamfer may have a substantially continuous slope relative to the longitudinal direction of between approximately 8° and approximately 12°, the first tubular element may be provided with a second portion initially having a local annular added thickness selected in the region of a fourth inner surface extending the second abutment surface in the direction of the first portion, and the third inner surface may comprise, at a selected location, a groove suitable for being arranged, after screwing, substantially in the region of the local added thickness; in this case, the first outer surface may comprise, after the diametral expansion, an annular shoulder having at least a portion of the shape of the groove and being in sealing interference contact therewith, the first tubular element may initially have in the region of its first portion, over its inner surface opposing the male thread, a conical neck in which is defined a second local annular set-back; in this case, the neck may initially grow substantially continuously at a slope relative to the longitudinal direction A of between approximately 2° and approximately 20°, the groove may initially comprise at least two curvilinear portions, possibly separated by a substantially cylindrical central portion; in this case, the portions may initially have substantially identical radii of curvature, for example of between approximately 2 mm and approximately 20 mm; the groove initially has a radial depth, the maximum value of which is preferably selected such that the material section at the bottom of the groove is greater than the product of the smallest section of a common portion of the tubes with which the first and second tubular elements are associated, and the efficiency of the joint under tension; the term "common portion of a tube" refers to the central portion remote from its two ends and having a substantially constant diameter, the male and female threads are preferably selected from among conical and cylindrical-type threads and are each formed over at least one tubular element portion, said second tubular element may be associated with a substantially symmetrical female/female-type connection sleeve and said first tubular element to an end of a great length tube; the sleeve may then comprise a central portion extended on either side by two second tubular elements and initially provided over an outer surface with an annular zone having a reduced thickness selected such that the initial thickness of said sleeve in the region of this zone is greater than or equal to the product of the section of a common portion of the tubes, at the ends of which are formed said first tubular elements, and the efficiency of the joint, the conical surfaces of the second and third abutment surfaces are convex and concave, respectively, so as to generate the first radial and sealing interference contact of the first inner surface against the second outer surface; in this case, the first and second lips may initially have shapes selected such that the first abutment surface rests on the fourth abutment surface before the second abutment surface is pressed onto the third abutment surface, in a variation, the conical surfaces of the second and third abutment surfaces may be concave and convex, respectively, so as to generate the first radial and sealing interference contact of the first outer surface against the third inner surface; in this case, the third inner surface of the second tubular element may initially have, in the region of its connection to the fourth abutment surface, a first sealing surface generally having a selected angle of inclination relative to the longitudinal direction and the first tubular element may initially have, in the region of its first outer surface and in the region of its connection to the first abutment surface, a second sealing surface generally having a selected angle of inclination relative to the longitudinal direction in such a way that, during screwing, the first and second sealing surfaces are radially tightened against one another, generating a third sealing interference contact; the first and second sealing surfaces may then be arranged in such a way that the first sealing interference contact is generated between them after the third sealing interference contact, so as to reinforce said third sealing interference contact, the selected angles of the first and second sealing surfaces may initially be between approximately +1° and approximately +30° (a zero angle for one of the two sealing surfaces is also conceivable), at least one of the first and second sealing surfaces may be a conical surface or a rounded surface (possibly having a toric-type portion), the first sealing surface may be defined by a third local annular set-back toward the interior of the third inner surface, the second sealing surface may be defined by a fourth local annular set-back toward the interior of the first outer surface.

The invention also relates to a method for producing an expanded tubular joint from an expandable tubular joint of the foregoing type.

This method consists, based on the aforementioned expandable tubular joint, then i) in screwing the first and second tubular elements until the first lip is accommodated in the annular recess and the second abutment surface rests against the third abutment surface so as to radially tighten, in a sealed manner by forming a first radial and sealing interference contact, one of the first inner and outer surfaces of the first lip against the second outer surface or the third inner surface respectively, and ii) in subjecting the expandable tubular joint, by means of an axially displaceable expansion tool, to a diametral expansion in the plastic deformation region, so as to force the first outer surface and the third inner surface locally to define a second sealing interference contact.

In this method, the starting point may be first and second lips initially having shapes selected such that the first interference contact is established between the first inner surface and second outer surface and that the first interference contact is not generated until the second abutment surface rests on the third abutment surface.

Moreover, if the conical surfaces of the second and third abutment surfaces are convex and concave respectively, the screwing may firstly force the first abutment surface to be pressed against the fourth abutment surface so as to cause the first lip to be subjected to axial compression in the elastic deformation region.

In a variation, if the conical surfaces of the second and third abutment surfaces are concave and convex respectively, the screwing may force the first and second sealing surfaces to seal radially against one another, generating first the third sealing interference contact then the first sealing interference contact, which comes to reinforce the third sealing interference contact. Moreover, the expansion may generate a fourth sealing interference contact between a free end of the first inner surface and the second outer surface.

A method of this type is particularly suitable, although in a non-limiting manner, for the radial expansion of the joint at an expansion rate at least equal to 10%.

Figure 4:
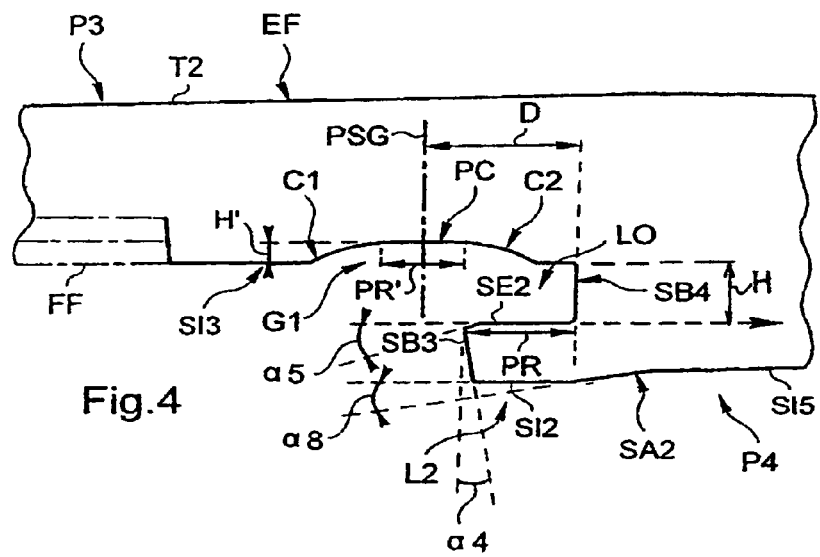
Figure 5:
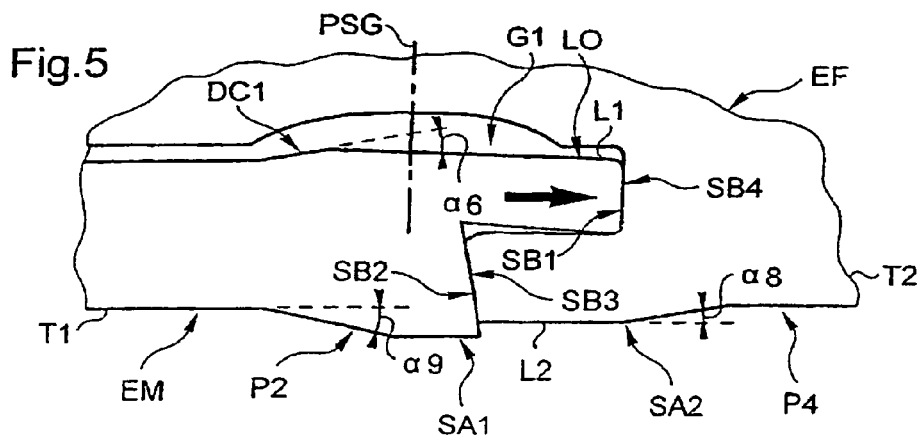
Figure 6:
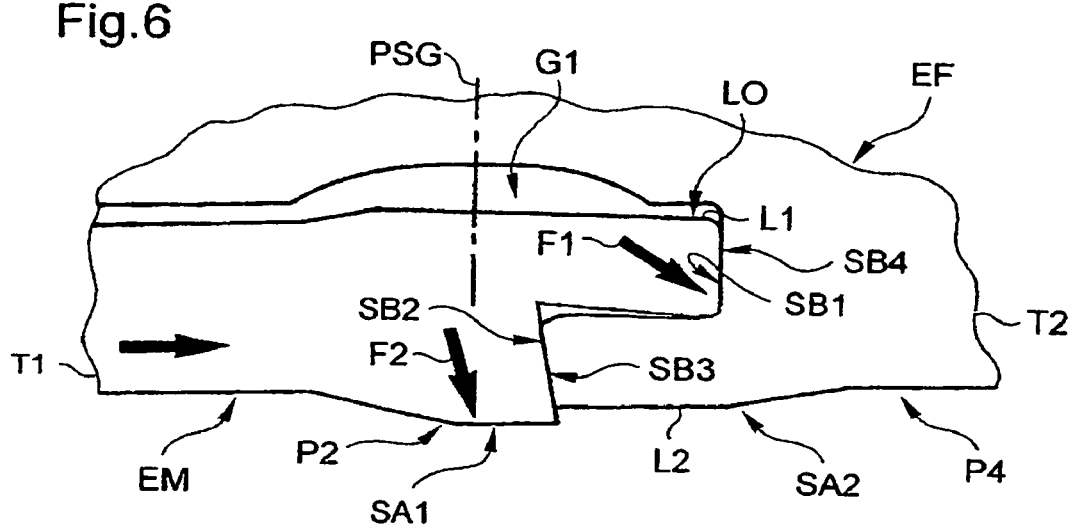
Figure 7:
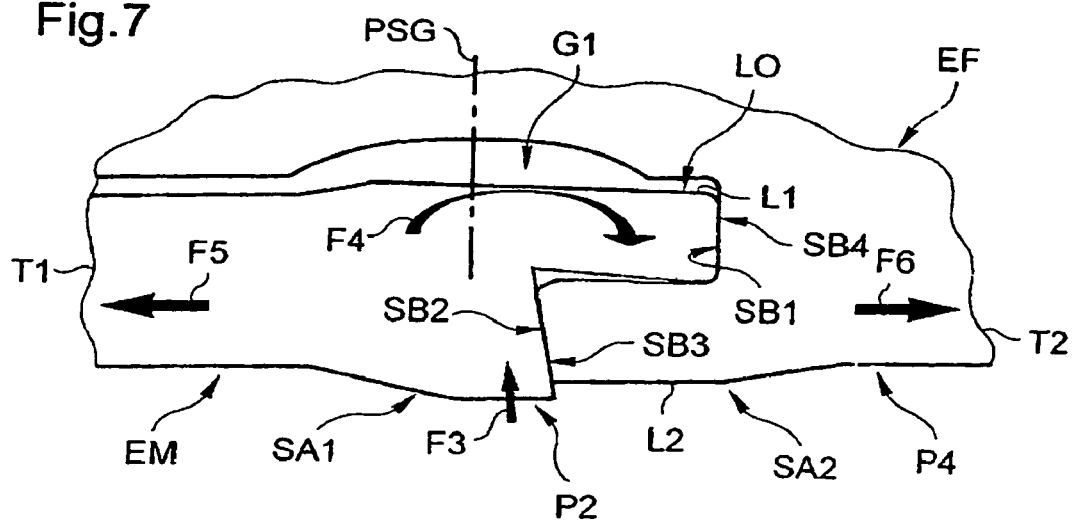
Figure 8:
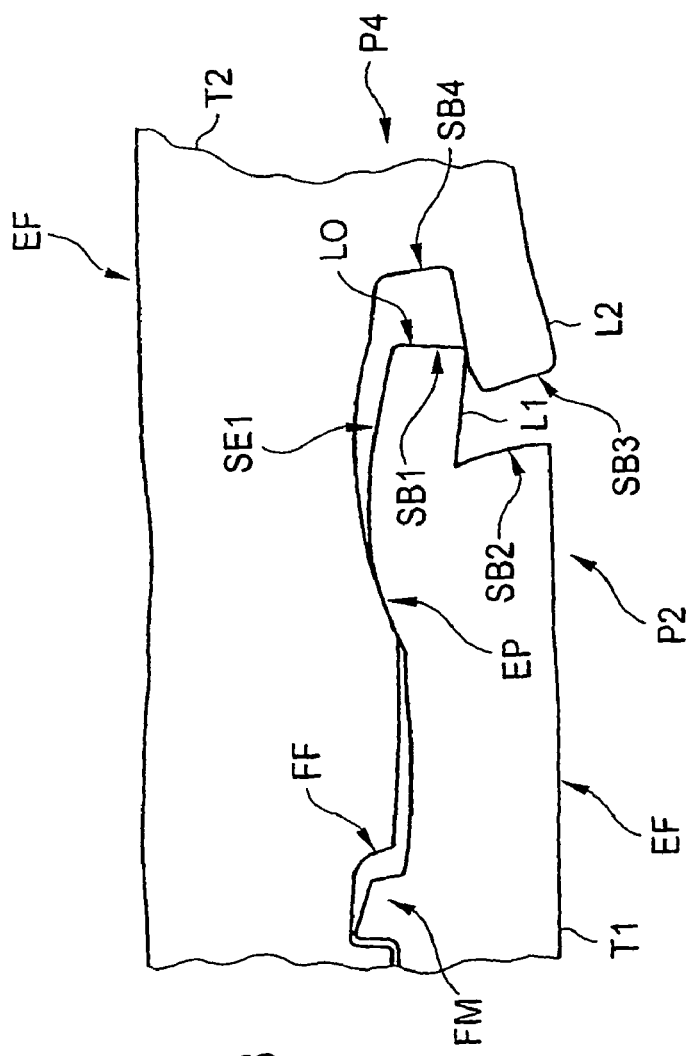
Figure 9:
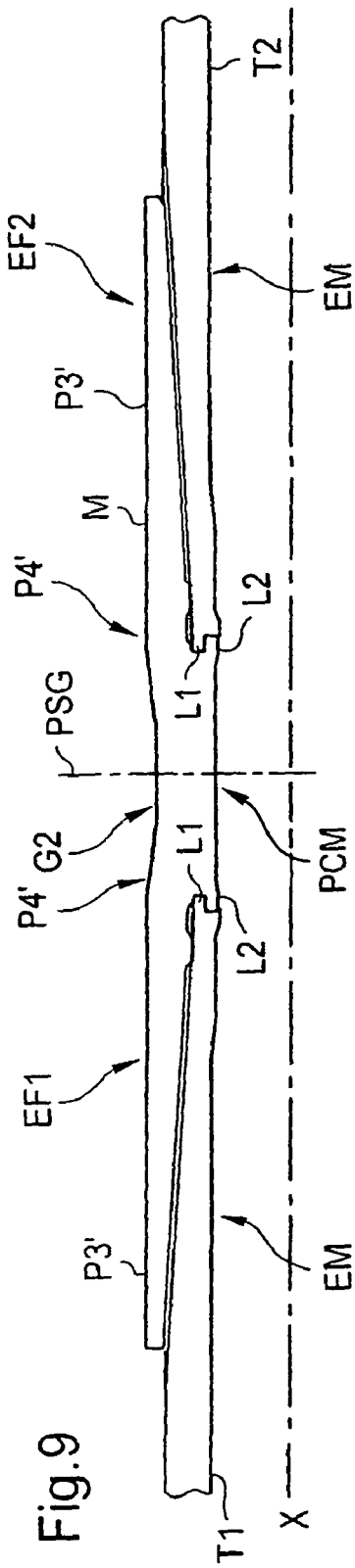

Other characteristics and advantages of the invention will become apparent on examining the following detailed description and accompanying drawings, in which:

FIG. 1 illustrates schematically, in a longitudinal section, a portion of an embodiment of an expandable threaded joint according to the invention, FIG. 2 illustrates schematically, in a longitudinal section, a portion of a female conical thread and of the matching male conical thread prior to screwing and expansion, FIG. 3 illustrates schematically, in a longitudinal section, a portion of the male end of the first tube of the expandable threaded joint of FIG. 1, FIG. 4 illustrates schematically, in a longitudinal section, a portion of the female end of the second tube of the expandable threaded joint of FIG. 1, FIG. 5 illustrates schematically, in a longitudinal section, the forces generated over the male and female ends of the tubes of FIGS. 3 and 4 during the first screwing step, FIG. 6 illustrates schematically, in a longitudinal section, the forces generated over the male and female ends of the tubes of FIGS. 3 and 4 during the second screwing step, FIG. 7 illustrates schematically, in a longitudinal section, the forces generated over the male and female ends of the tubes of FIGS. 3 and 4 during the step of expansion by plastic deformation, FIG. 8 illustrates schematically, in a longitudinal section, the deformations undergone by the male and female ends of the tubes of FIGS. 3 and 4 after the expansion step, FIG. 9 illustrates schematically, in a longitudinal section, a portion of an embodiment of an assembly of two expandable threaded joints according to the invention, disposed symmetrically, FIG. 10 illustrates schematically, in a longitudinal section, a portion of another embodiment of the male end of a first tube of an expandable threaded joint according to the invention, FIG. 11 illustrates schematically, in a longitudinal section, a portion of another embodiment of the female end of a second tube of an expandable threaded joint according to the invention, and FIG. 12 illustrates schematically, in a longitudinal section, the relative positions of the male and female ends of the tubes of FIGS. 10 and 11 after the screwing phase.

The accompanying drawings may serve not only to supplement the invention, but also possibly to contribute to the definition thereof.

The invention relates to a sealed threaded tubular joint, which may be used, in particular, in a hydrocarbon well or in a similar well such as a geothermal well, and to the associated production method.

As indicated in the introduction, a threaded tubular joint according to the invention may allow casing or tubing strings to be formed, by joining great length metallic tubes together or else great length tubes and sleeves together.

Reference will firstly be made to FIG. 1 to 8 in order to describe a first embodiment of a joint according to the invention. In this example, as is partially illustrated in FIG. 1, the joint allows the connection of two tubes T1 and T2, having an axis XX generated by revolution and being of great length i.e. several metres long, and more specifically of the male-type end EM (or male tubular element) of a first tube T1 and the female-type end EF (or female tubular element) of a second tube T2. In the illustrated embodiment, the tubes T1 and T2 have, for example, a common portion, the initial outer diameter of which is equal to approximately 193.68 mm (or 7⅝"). The common portion of a tube is the central portion remote from its two ends and having a substantially constant diameter.

As is illustrated in FIG. 1, the male end EM of a tube T1 comprises two portions P1 and P2. The first portion P1 extends the central portion of the tube T1 and is provided with an outer male thread FM, preferably conical in type, though it could also be cylindrical in type.

For example, as illustrated in FIG. 2, a conical thread is provided, the conicity $\Delta D/D$ of which, where D is the diameter, is 10%. Moreover, the axial (or longitudinal) clearance between the threads is initially sufficiently large to provide them with a specific freedom of displacement during the diametral expansion, to which reference will be made hereinafter. For example, the axial clearance between the stabbing flanks FS of the threads of the male FM and female FF threads is between approximately 0.05 mm and approximately 0.3 mm and, more preferably still, between approximately 0.05 mm and approximately 0.25 mm.

Furthermore, in order to provide good tensile, but especially compressive, resistance and therefore to reduce the risk of disengagement or jumping out of the male and female threads prior to, during and after the expansion, the carrier flank (or "loading flank") FL of the threads is, for example, inclined relative to the radial direction by a negative angle $\alpha 1$ of between approximately −3° and approximately −15° and more preferably equal to approximately −10°, whereas the stabbing flank FS of the threads is, for example, inclined relative to the radial direction by a positive angle $\alpha 2$ of between approximately +10° and approximately +30° and more preferably equal to approximately +15°.

The negative angle $\alpha 1$ prevents disengagement or jumping out of the engaged threads, in particular under tension. Moreover, the greater the positive angle $\alpha 2$, the easier the engagement of the threads, but the more the compressive resistance is impaired.

It is important to note that the male FM and female FF threads may each be formed over at least one portion of tubular element EM, EF. In other words, they may be in the form of one or more portions. If they consist of two portions, said portions may possibly be formed over two radially separate surfaces or alternatively over a single surface.

The second portion P2 extends the first portion P1 at the end of the tube T1. It comprises, firstly, as illustrated in FIG. 3, a first annular lip (or annular finger) L1 comprising a first axial abutment surface SB1, initially substantially planar and perpendicular to the longitudinal direction A of the tube T1 (parallel to XX), a first inner surface SI1, initially extending in a substantially perpendicular manner the first axial abutment surface SB1 in the direction of the first portion P1 and oriented toward the interior of the tube T1 (i.e. on the side opposing the male thread FM), and a portion of a first outer surface SE1, also extending the first axial abutment surface SB1 in the direction of the first portion P1 and oriented toward the exterior of the tube T1. The first outer surface SE1 of the second portion P2 of the male element EM extends from the first abutment surface SB1 up to the region of the male thread FM. The second portion P2 also comprises a second abutment surface SB2 extending the first inner surface SI1 and extended by a (fourth) at least partially cylindrical inner surface SI4 intended to be in contact with the fluid (or gas) circulating in the tube T1. The first axial abutment surface SB1, first inner surface SI1 and second abutment surface SB2 define what a person skilled in the art calls a "male rebate".

As is illustrated in FIG. 3, the first inner surface SI1 may be inclined by a selected angle α3 relative to the longitudinal direction A of the tube T1, for a reason which will be referred to hereinafter. It thus initially forms a conical surface. The angle of inclination is preferably between approximately 0.1° and approximately 15° and is more preferably equal to approximately 2.5°. Moreover, as shown, the first outer surface SE1 may be slightly rounded and more specifically toric having a large radius, for example between 20 mm and 100 mm, in order to allow it to be pressed into a groove G1, as will be seen hereinafter.

As is illustrated in FIG. 4, the female end EF of a tube T2 also comprises two portions P3 and P4. The first portion P3, arranged furthest toward the end of the tube T2, is provided with an inner female thread FF, matching the male thread FM.

The second portion P4 extends the first portion P3 toward the central portion of the tube T2. It comprises, firstly, a second annular lip (or annular finger) L2 comprising a third abutment surface SB3, a second outer surface SE2, oriented toward the exterior of the tube T2, extending the third abutment surface SB3 in a direction opposing the first portion P3 and intended to be arranged facing the first inner surface SI1, and a second, at least partially cylindrical inner surface SI2, oriented toward the interior of the tube T2 and also extending the third abutment surface SB3 in a direction opposing the first portion P3.

It also comprises a fourth axial abutment surface SB4, initially substantially planar and perpendicular to the longitudinal direction A of the tube T2, and a third, partially cylindrical inner surface SI3, oriented toward the interior of the tube T2 and extending the fourth axial abutment surface SB4 in the direction of the first portion P3. A portion of the third inner surface SI3 defines, together with the second outer surface SE2 and fourth abutment surface SB4, an annular recess (or groove) LO matching the first lip L1 so as to receive it during the phase of screwing the tubes T1 and T2, to which reference will be made hereinafter.

The recess LO extends over a selected axial length PR, equal to that of the second lip L2, and at a selected radial depth H (perpendicular to the longitudinal direction A). The PR/H ratio is preferably between approximately 1 and approximately 3 and is more preferably between approximately 1.2 and approximately 1.6. It is even more preferably equal to approximately 1.5. For example, PR is equal to 4 mm and H is equal to 2.7 mm, thus providing a PR/H ratio substantially equal to 1.5. As will be seen hereinafter, these two dimensions PR and H are selected so as to allow a selected deformation of the first lip L1 and of the zone at the root thereof.

The third abutment surface SB3, second outer surface SE2 and fourth axial abutment surface SB4 define what a person skilled in the art calls a "female rebate".

An annular groove G1 is also defined in at least a portion of the third inner surface SI3. Preferably, it initially comprises a substantially cylindrical central portion PC extended on either side by two curvilinear portions PC1 and PC2. Preferably, these curvilinear portions C1 and C2 initially have substantially identical radii of curvature, preferably between approximately 2 mm and approximately 20 mm. However, this groove G1 may comprise only two curvilinear portions.

For example, the groove G1 comprises a central portion PC extending over an axial length PR' equal to approximately 2 mm, a radial depth H' equal to approximately 1 mm, and curvilinear portions C1 and C2 having a radius of curvature equal to approximately 5 mm. The radial depth H' of the groove G1 is generally limited by the thickness of the tube T2, in the region of the plane of symmetry PSG of said groove, which thickness must not be less than a minimum thickness used to calculate the critical section of the threaded joint More specifically, the maximum value of the radial depth H' is selected such that the material section at the bottom of the groove G1 is greater than the product of the section of the tube T1 or T2 in its common portion (or the smaller of these two sections if they are different), and the efficiency of the joint under tension. The ratio between the critical section of the threaded elements and the section of tube (T1, T2) characterises the efficiency of the connection (or of the joint), which is, along with the section of the tube, an item of input data for the design of a tubular string.

In this configuration, the plane of symmetry PSG of the groove G1 is arranged at a selected axial distance D from the fourth axial abutment surface SB4 which defines the bottom of the recess (or groove) LO. For example, with the aforementioned values, the distance D is equal to approximately 5.61 mm. Furthermore, after screwing, the central portion PC of the groove G1 is arranged substantially facing the added thickness SA1.

As will be seen hereinafter, the radius of curvature (in particular on the side of the thread), the radial depth H', the axial length PR and the radial depth H are selected so as to allow the selected deformation of the first lip L1 and of the zone of the second portion P2 at the root thereof.

The second portion P4 also comprises another (fifth) cylindrical inner surface SI5 extending the second abutment surface SB2 in the direction opposing the first portion P3 (i.e. in the direction of the central portion of the tube T2) and intended to be in contact with the fluid (or gas) circulating in the tube T2.

According to the invention, the second abutment surface SB2 and the third abutment surface SB3 initially have conical surfaces having selected substantially identical angles of inclination α4 relative to a plane perpendicular to the longitudinal direction A. In this first embodiment, the conical surfaces of the second abutment surface SB2 and third abutment surface SB3 are convex and concave respectively.

Preferably, as illustrated in FIGS. 3 and 4, the second SB2 and third SB3 abutment surfaces have substantially the same initial inclination. The term "substantially identical inclinations" refers, in the present context, to mutually equal inclinations, to within approximately ±5°. This common inclination is preferably between an angle α4 of approximately +5° and an angle α4 of approximately +30°. It is more preferably still equal to approximately 10°.

This inclination allows the first lip L1 to be radially prestressed, when the second abutment surface SB2 rests against the third abutment surface SB3 during the screwing phase, in the direction of the axis of the joint and its first inner surface SI1 therefore to be radially tightened, and in a sealing manner, against the second outer surface SE2 of the second lip L2 (owing to their selected respective shapes), thus defining a first sealing interference contact having a radial component.

An expanded tubular joint according to the invention is formed by carrying out a method comprising the following steps.

In a first step, illustrated in FIG. 5, the end, for example the male end EM, of one of the tubes, for example T1, is screwed to the end, for example the female end EF, of the other tube, for example T2, until the first axial abutment surface SB1 of the first lip L1 rests on the fourth axial abutment surface SB4 of the recess (or groove) LO.

In order to facilitate this screwing, and as illustrated in FIG. 4, the second outer surface SE2 of the second lip L2 may have over a short distance an inclination of a selected angle α5 relative to the longitudinal direction A, in the region of its connection to the third abutment surface SB3. It thus initially forms a conical surface chamfer. Preferably, this inclination is initially between an angle of approximately +8° and an angle of approximately +12°. More preferably still, it is equal to approximately 10°. An inclination of this type facilitates the penetration of the first lip L1 into the recess (or groove) LO, in particular in the case of accidental interference, thus enabling to reduce possible risks of galling or of damage to the first lip L1 and, in particular, of the end ridge of its first inner surface SI1. Such interference may occur between the first inner surface SI1 and second outer surface SE2 before the second abutment surface SB2 rests on the third abutment surface SB3.

Then, in a second step, the screwing process is continued until the second abutment surface SB2 of the first lip L1 rests on the third abutment surface SB3 of the second lip L1. The continuation of the screwing process, once the first abutment surface SB1 has been brought into abutment with the fourth abutment surface SB4, allows initiation of the storage of potential resilient energy in the first lip L1, by subjecting said first lip to axial compression.

In a third step, illustrated in FIG. 6, the screwing process is continued further in order radially to prestress the first lip L1 in the direction of the axis of the joint, owing to the inclination (or slope) of the second SB2 and third SB3 abutment surfaces of the first L1 and second L2 lips and to the cooperation of the first SB1 and fourth SB4 axial abutment surfaces. In FIG. 6, this prestressing is indicated by the arrows F1 and F2.

The contact between the various abutment surfaces and the two lips is thus particularly reinforced, allowing the joint to be sealed prior to the diametral expansion step. Excellent tightness to fluids under internal pressure, for example in the presence of axial tensile or compressive forces, is thus obtained prior to expansion.

In a fourth step, a diametral expansion tool, such as, for example, a ball having a conical head, the maximum diameter of which is greater than the initial inner diameter D1 of the tubes T1 and T2 (equal to twice the inner radius RI indicated in FIG. 1) and is substantially equal to the final inner diameter thereof, is introduced axially into one of the tubes T1 and T2. The selection of the direction of the introduction is of no real importance. The ball may therefore be displaced axially from a male end EM toward a female end EF, or vice versa.

The ball is displaced in a manner known to a person skilled in the art (see, in particular, documents U.S. Pat. No. 6,604,763 and WO 03/071086), for example by pulling by means of drill rods or else by exerting hydraulic pressure. The ball has, for example, a cylindrical/conical shape with a conical inlet portion responsible for carrying out the expansion and extended by a median cylindrical portion. However, it may also be spherical or biconical in shape (conical inlet portion extended by a cylindrical portion, itself extended by a conical outlet portion). The connecting radii of these three portions of the ball are selected as required.

Other expansion tools may be used instead of balls, such as, for example, a rotary expansion tool with three rollers providing mechanical expansion. These expansion tools (including balls) and the embodiments thereof are described, in particular, in patent documents WO 02/081863, U.S. Pat. No. 6,457,532 and US 2002/0139540.

The diametral expansion takes place in the plastic deformation region. As the plastic deformations generated increase the yield point of the tubular elements, metals able to withstand such deformations must be used. For example, for a tube initially having a yield point of 310 MPa (45 KSI), this point increases to 380 MPa (55 KSI) after expansion.

When the ball reaches the region of the fourth inner surface SI4 of the second portion P2 of the male end EM and of the fifth inner surface SI5 of the second portion P4 of the female end EF, the expanded material forces the first lip L1 to undergo deformation in the groove G1.

The deformations undergone by the joint during the expansion are indicated by the arrows F3 to F6 in FIG. 7.

More specifically, the first lip L1 is forced to bend (arrow F4) and to take on, at least in part, the shape of the groove G1. An annular shoulder or heel EP, allowing the formation of a zone for sealing by "metal-on-metal"-type interference contacts, is thus formed, as illustrated in FIG. 8, in the region of the first outer surface SE1 of the male end EM, just before the first lip L1.

The shoulder EP and the seal may be reinforced by the presence of a local annular added thickness SA1 in the direction of the interior of the tube T1, in the region of the fourth inner surface SI4 and in the vicinity of the second abutment surface SB2. Preferably, as illustrated in FIGS. 3 and 5 to 7, this added thickness SA1 is substantially constant in the extension zone of the central portion PC of the groove G1, then it is reduced. This reduction is preferably substantially continuous in the direction of the first portion P1. It may, for example, take place at an angle α9 relative to the longitudinal direction A of between approximately 5° and approximately 30°, more preferably between approximately 10° and approximately 20°, and even more preferably equal to approximately 12°.

The maximum added thickness in the region of the zone of constant thickness defines a minimum inner diameter of the male element EM. This inner diameter must be greater than the diameter of an inspection tool (known to a person skilled in the art as a "drift"). The drift is a tool which is introduced inside tubes, before they are lowered into wells, in order to ensure that they have a minimum free internal diameter allowing tools to pass within the string without a risk of their becoming caught. If it remains less than the above-mentioned value, the optimal value of the added thickness is then fixed by the amount of material required to increase to the maximum the first lip L1 in the bottom of the groove G1 during the expansion so that it undergoes deformation as required. This added thickness is, for example, equal to approximately 0.8 mm.

This added thickness SA1 provides an excess of material allowing the empty space in the groove G1 to be filled and the first lip L1 and the zone located just before said first lip accordingly to take on the shape of at least a portion of said groove G1, and therefore to have substantially the desired deformation.

The deformation generates, as indicated above, the annular shoulder or heel EP, in the region of the first outer surface SE1 of the male end EM, before the first lip L1, which enables the creation of a sealed zone by interference contacts in the manner indicated hereinafter.

The expansion produced by the ball, owing to the fact that the diameter of the female element EF is greater than that of the male element EM, results in a greater rate of expansion of the male element EM than of the female element EF.

Greater contraction of the male element EM than of the female element EF ensues, owing to the preservation of the material, resulting in a relative axial displacement of these two elements in the direction of a release indicated by the arrows F5 and F6 in FIG. 7. This displacement causes the inclined shoulders EP to be strongly tightened against one another, forming the desired seal. It will be noted that the contact or interference pressure is further reinforced when the expanded joint is subjected to axial tensile stresses.

Owing to the axial disengagement during the expansion, the axial lengths of the first L1 and second L2 lips must be selected in a precise manner. If the first lip L1 is too short, there is a risk that it will leave its recess LO and therefore fall toward the axis of the joint, thus eliminating the seal after expansion. If the second lip L2 is too long, the recess LO is difficult to form.

The curvature of the first lip L1 during the expansion, promoted by the shape of the groove G1 and the added thickness SA1, results in a second interference contact between the inner portion of the end of the first lip L1 and the second outer surface SE2.

The first lip L1 is then buttressed and wedged between the shoulder formed in the wall of the groove G1 and the second outer surface SE2. A double contact of this type provides an excellent seal, stable for the various possible forms of loading, comprising both internal and external pressure combined or not with axial tensile or compressive stresses.

In order further to promote the curvature of the first lip L1 and further to reinforce the contact between the shoulder or heel EP and the groove G1, a set-back DC1 toward the interior of the tube T1 may be provided, as illustrated in FIGS. 3 and 5 to 7, in the region of the first outer surface SE1 and before the first portion P1. This set-back DC1 is preferably substantially continuous. It thus initially forms a conical chamfer. It may, for example, be at an angle $\alpha 6$ relative to the longitudinal direction A of between approximately 8° and approximately 12° and is more preferably equal to approximately 10°. For example, this set-back DC1 starts at a distance from the first axial abutment surface SB1 (in the longitudinal direction A) equal to approximately 7.8 mm.

Furthermore, in order to provide material where it is required, the tube T1 may undergo, in the region of its first P1 and second P2 portions and prior to machining of the male element EM, a conical neck having an apex half-angle $\alpha 7$, the diameter of the cone gradually decreasing toward the free end of the male element EM.

This neck allows the material thickness to be increased in the region of the second portion P2 and the added thickness SA1 to be accommodated. After machining of the male element EM and, in particular, of the added thickness SA1, the path of the neck forms a local annular set-back DC2 toward the interior of the tube, toward the free end of the male element EM.

In order not to hinder the progress of the ball in the tube T1, the neck is preferably substantially continuous and the angle $\alpha 7$ is between approximately 2° and approximately 20° and is more preferably equal to approximately 5°.

If the first inner surface SI1 of the first lip L1 has an inclination (for example, of approximately 2.5°), this allows the second lip L2 to be arranged in closer proximity to the exterior of the tube T2. Accordingly, when the ball reaches the region of the second lip L2, said second lip is able to get close to the exterior of the tube T2. This also allows limitation of what is known as the "banana" effect, which tends to cause the second lip L2 to fall toward the interior of the cavity of the tube T2.

This closeness may be accentuated by the presence of a local annular added thickness SA2 in the direction of the interior of the tube T2, in the region of the second inner surface SI2 of the second lip L2 and in the vicinity of the third abutment surface SB3. Preferably, as illustrated in FIG. 4 to 7, this added thickness SA2 is substantially constant in the extension zone of the second lip L2, then it is reduced. This reduction is preferably substantially continuous. It thus initially forms a conical chamfer. It may, for example, be at an angle $\alpha 8$ relative to the longitudinal direction A of between approximately 8° and approximately 12° and is more preferably equal to approximately 10°.

This added thickness SA2 is preferably dependent on the added thickness SA1 and is, more preferably still, less than said added thickness SA1. It is, in any case, less than a maximum value defined by the diameter of the drift. For example, this added thickness SA2 is between approximately 0.3 mm and 0.8 mm and is preferably equal to approximately 0.5 mm. The initial offset provided by different added thicknesses SA1 and SA2 promotes the final deformation, in particular of the first lip L1. However, this offset may not be too great, since it may cancel the aforementioned effect provided by the inclination of the first inner surface SI1 of the first lip L1 (if such inclination exists).

As mentioned above, the result of the expansion generated by the passing of the ball is illustrated in FIG. 8. It is important to note that in sleeved joints (and not in integral joints), the deformations of the first L1 and second lips L2 may not be completely identical at the two opposing ends of the sleeve, owing to the fact that the expansion causes axial disengagement. This difference (or dissymmetry) is, however, less than that occurring in the sleeved joints described in document FR 02/03842.

It is also important to note that the spring-back displacement of the elements of the threaded joint after the passing of the ball is negligible compared to the plastic deformations in question.

Reference will now be made to FIG. 9 in order to describe an embodiment of an assembly of two joints according to the invention, disposed symmetrically. In this example, the two joints allow two great length tubes T1 and T2 to be connected via a connection sleeve-type tubular element M. This sleeve M is, in this case, symmetrical in form relative to a plane of symmetry PSM perpendicular to the longitudinal direction A of the tubes T1 and T2. It is also of the female/female-type.

A sleeve M of this type comprises a central portion PCM extended on either side by two first portions P3' and two second portions P4', of the same type as the first (P3) and second (P4) portions of the female end EF of the tube T2 presented above. Everything that was stated hereinbefore with regard to the first (P3) and second (P4) portions of the female end of the tube T2 therefore also applies to the first portions P3' and second portions P4' of the sleeve M.

As illustrated, the central portion PCM of the sleeve M preferably comprises an annular groove G2 (also referred to as a "lunula") locally defining a reduced thickness centred on the plane of symmetry PSM.

This lunula G2 allows the thickness of the sleeve M to be reduced in its thickest portion and the expansion pressures and forces therefore to be reduced. It also allows the deformations to be better controlled in the region of the various abutment surfaces (SB1 to SB4) and bearing surfaces, while at the same time providing the joint with a substantially rectilinear appearance (at the outer surface generated by revolution) after expansion. The thickness of the sleeve M in the region of its plane of symmetry PSM must therefore be selected so as to be greater than or equal to the product of the section of the common portion of the tubes T1 and T2 at the ends of which are formed the first tubular elements, and the efficiency of the joint.

Preferably, the lunula extends substantially between the two third axial abutment surfaces SB3 of the two opposing second lips L2. However, it may extend over a greater distance, in particular between the last threads of the two female threads FF. The last threads are, in this case, those on the side of the third abutment surfaces SB3.

This lunula G2 may also be in the form of a dish provided with a central portion having the maximum reduced thickness (in the region of the plane of symmetry PSM) and lateral walls inclined at an angle of preferably less than approximately 30° and more preferably equal to approximately 15°.

It is important to note that the lunula (and therefore the groove G2) is not necessarily symmetrical relative to the plane PSG. It may have two dissymetrical portions either side of the plane PSG.

Reference will now be made to FIG. 10 to 12 in order to describe another embodiment of an expandable tubular joint according to the invention.

This embodiment has numerous similarities to that described above with reference to FIG. 1 to 8. The common elements are therefore denoted by identical reference numerals. Moreover, elements substantially identical in form and performing substantially identical functions will not be redescribed.

Furthermore, this embodiment, like the preceding one, concerns joints allowing not only the connection of the male-type end EM (or male tubular element) of a first tube T1 of great length, having an axis XX generated by revolution, and the female-type end EF (or female tubular element) of a second tube T2, also of great length and with an axis XX generated by revolution, but also the joining of two symmetrically disposed joints, described above with reference to FIG. 9, and the connection of two great length tubes T1 and T2 via a connection sleeve-type tubular element M.

The main difference between this embodiment and the preceding one is the detail of the second SB2 and third SB3 abutment surfaces and possibly also the detail of the first outer surface SE1 and third inner surface SI3 of the first EM and second EF tubular elements, which allow the first and third seals (or interference contacts) to be formed prior to expansion.

The second abutment surface SB2 and the third abutment surface SB3 still initially have conical surfaces having substantially identical selected angles of inclination α4 relative to a plane perpendicular to the longitudinal direction A. However, in this second embodiment, the conical surfaces of the second abutment surface SB2 and third abutment surface SB3 are concave and convex respectively.

The inclinations of the angles α4 are selected such that the second abutment surface SB2 rests against the third abutment surface SB3, generating the first radial and sealing interference contact of the first outer surface SE1 (of the first lip L1) against the third inner surface SI3.

Preferably, as illustrated in FIG. 10 to 12, the second SB2 and third SB3 abutment surfaces have substantially the same initial inclination. This common inclination is preferably between an angle α4 of approximately +5° and an angle α4 of approximately +30°. More preferably still, it is equal to approximately 10°.

When the second abutment surface SB2 rests against the third abutment surface SB3 during the screwing phase, the first lip L1 is forced toward the exterior of the connection. This allows the first lip L1 to be radially prestressed and its contact to the second tubular element EF in the region of the recess LO therefore to be reinforced.

Moreover, it is advantageous that the third inner surface SI3 of the second tubular element EF comprises a portion DC3, arranged between its connection to the fourth abutment surface SB4 and the second curvilinear portion C2 of the groove G1, and in which is initially defined a first sealing surface generally having an inclination of a selected angle α10 relative to the plane transverse to the longitudinal direction A.

This first sealing surface DC3 may possibly be defined by a third local annular set-back toward the interior of the third inner surface SI3. It may be in the form of a conical surface or a rounded surface, possibly having a toric-type portion.

The angle of inclination α10 of the first sealing surface (possibly of the third local annular set-back DC3 is preferably initially between approximately +1° and approximately +30° and is more preferably equal to approximately 10°.

Furthermore, the first outer surface SE1 of the first tubular element EM comprises a terminal zone located in the region of its connection to the first abutment surface SB1 (and therefore in the region of the first lip L1) and in which is initially defined a second sealing surface generally having an inclination of a selected angle α11 relative to the plane transverse to the longitudinal direction A.

This second sealing surface may possibly be defined by a fourth local annular set-back toward the interior of the first outer surface SE1. It may be in the form of a conical surface or a rounded surface, possibly having a toric-type portion.

This second sealing surface DC4 is intended to be tightened radially, during the screwing phase, against the first sealing surface DC3 of the second tubular element EF.

The angle of inclination α11 of the second sealing surface (possibly of the fourth local annular set-back) DC4 is preferably initially between approximately +1° and approximately +30° and is more preferably equal to approximately 10°.

The angles of inclination α10 and α11 are preferably identical. However, this is not obligatory. It is, for example, conceivable that one of the first DC3 and second DC4 sealing surfaces is conical or rounded and has a non-zero inclination, whereas the other sealing surface is, for example, cylindrical and has a zero inclination.

The first DC3 and second DC4 sealing surfaces, possibly defined by the third and fourth local annular set-backs, are respectively arranged so that they may be radially tightened against one another, during the screwing phase, generating a third sealing interference contact.

Moreover, the first DC3 and second DC4 sealing surfaces may be arranged in such a way that the first sealing interference contact is generated after the third sealing interference contact. This allows the first sealing interference contact to be reinforced.

In other words, during the screwing phase, it is preferable that the first lip L1 enters firstly into contact, via the first sealing surface DC3, with the second sealing surface DC4, then that the second abutment surface SB2 rests on the third abutment surface SB3.

In this embodiment, the central portion PC of the annular groove G1 extends, for example, over an axial length PR' equal to approximately 2.2 mm, a radial depth H' equal to approximately 1 mm, and the curvilinear portions C1 and C2 have, for example, a radius of curvature equal to approximately 5.3 mm. Furthermore, the axial distance D separating the plane of symmetry PSG of the groove G1 from the fourth axial abutment surface SB4, which defines the bottom of the recess (or groove) LO, is, for example, equal to approximately 5.7 mm.

The recess LO still extends over a selected axial length PR, equal to that of the second lip L2, and at a selected radial depth H (perpendicular to the longitudinal direction A). The PR/H ratio is still preferably between approximately 1 and approximately 3, but it is in this case more preferably between approximately 1.4 and approximately 1.9 and is, more preferably still, equal to approximately 1.7. For example, PR is equal to 4.2 mm and H is equal to 2.4 mm, providing a PR/H ratio equal to approximately 1.7.

Moreover, as in the preceding embodiment, the second outer surface SE2 of the second lip L2 may have over a short distance an inclination of a selected angle $\alpha 5$ relative to the longitudinal direction A, in the region of its connection to the third abutment surface SB3. It thus initially forms a conical surface chamfer, the inclination of which is initially between an angle of approximately +8° and an angle of approximately +12° and is more preferably equal to approximately 10°. As indicated above, this allows the first lip L1 to penetrate the recess (or groove) LO, in particular in the case of accidental interference.

Furthermore, as in the preceding embodiment, the first inner surface SI1 of the first lip L1 is preferably inclined at a selected angle $\alpha 3$ relative to the longitudinal direction A of the tube T1. It thus initially forms a conical surface. The angle of inclination is still preferably between approximately 0.1° and approximately 15° and is more preferably equal to approximately 2.5°. As indicated above, this inclination allows the second lip L2 to get closer to the exterior of the tube T2 during the passing of the ball, thus limiting the banana effect.

In addition, as in the preceding embodiment, in order to promote the curvature of the first lip L1 and to reinforce the contact between the shoulder or heel EP and the groove G1, the first outer surface SE1 may comprise, just before the first portion P1, a first, preferably substantially continuous setback DC1 toward the interior of the tube T1. This first setback DC1 initially forms a conical chamfer having an angle $\alpha 6$ relative to the longitudinal direction A of between approximately 8° and approximately 12° and more preferably equal to approximately 10°. For example, this set-back DC1 starts at a distance from the first axial abutment surface SB1 (in the longitudinal direction A) equal to approximately 8.1 mm.

Also as in the preceding embodiment, the fourth inner surface SI4 may comprise a local annular added thickness SA1 in the direction of the interior of the tube T1, in the vicinity of the second abutment surface SB2. Preferably, as illustrated in FIGS. 10 and 12, this added thickness SA1 is substantially constant in the extension zone of the central portion PC of the groove G1, then it decreases, preferably substantially continuously, in the direction of the first portion P1. It may, for example, be at an angle $\alpha 9$ relative to the longitudinal direction A of between approximately 5° and approximately 30°, more preferably between approximately 10° and approximately 20° and, more preferably still, equal to approximately 12°.

Similarly, the fifth inner surface SI5 of the second lip L2 may comprise, as in the preceding embodiment, a local annular added thickness SA2 in the direction of the interior of the tube T2, in the vicinity of the third abutment surface SB3. Preferably, as illustrated in FIGS. 11 and 12, this added thickness SA2 is substantially constant in the extension zone of the second lip L2, then it decreases preferably substantially continuously. It thus initially forms a conical chamfer. It may, for example, be at an angle $\alpha 8$ relative to the longitudinal direction A of between approximately 8° and approximately 12° and is more preferably equal to approximately 10°. This added thickness SA2 is preferably dependent on the added thickness SA1 and is preferably less than said added thickness SA1. For example, this added thickness SA2 is between approximately 0.3 mm and 0.8 mm and is preferably equal to approximately 0.5 mm.

The formation of an expanded joint from an expandable joint of the type described above with reference to FIG. 10 to 12 is substantially identical to that described with reference to FIG. 5 to 8.

In a first step, the end, for example the male end EM, of one of the tubes, for example T1, is screwed to the end, for example the female end EF, of the other tube, for example T2, until the second sealing surface DC4 enters into contact with the first sealing surface DC3, generating the third sealing interference contact.

In a second step, the screwing process is continued until the second abutment surface SB2 rests on the third abutment surface SB3 of the second lip L2, generating the first radial and sealing interference contact of the first outer surface SE1 against the third inner surface SI3.

In a third step, the screwing process is further continued in order radially to prestress the first lip L1, owing to the inclination (or slope) of the second SB2 and third SB3 abutment surfaces of the first L1 and second L2 lips and owing to the inclination (or slope) of the first DC3 and second DC4 sealing surfaces of the recess LO and of the first lip L1, up to a specified torque level.

The contact between the inner and outer surfaces of the lip L1 and the recess LO is thus reinforced to a greater extent than in the preceding example, which enables to ensure a much stronger seal of the joint prior to the diametral expansion step.

Excellent tightness to fluids under internal pressure, for example in the presence of axial tensile or compressive forces, is thus obtained prior to expansion.

The fourth step, which consists in diametrally expanding the joint in the plastic deformation region by the axial introduction of a diametral expansion tool, such as, for example, a conical-headed ball, into one of the tubes T1 and T2, is identical to that described above.

At the end of expansion, a fourth sealing interference contact is defined between a free end of the first lip L1 (in the region of its first inner surface SI1) and the second outer surface SE2 of the second lip L2. The first lip L1 is thus wedged by its free end, owing to the fourth interference contact, and by the "heel" extending it in the region of the first outer surface SE1, owing to the second interference contact.

If the first tubular element EM comprises a first sealing surface DC3 and possibly if the second tubular element EF comprises a second sealing surface DC4, the gap in sealing performances between the upstream and downstream sides of an assembly of joints is substantially reduced once the fourth step has been completed. This results in an increase in the contact pressures on the upstream side without impairing the contact pressure, on the downstream side.

The invention provides joints having good, or even excellent, tightness to gases under high pressure, both internal and external, both prior to and after the expansion phase, for example in the presence of high, or even very high, expansion rates, typically between 10% and 35%. Obviously, the invention also applies to expansion rates of less than 10%.

Furthermore, the invention prevents the deformations during the expansion from becoming excessively dissymmetrical, in the case of a sleeved assembly, and therefore provides effective sealing of the expanded threaded joints formed on either side of the central portion of the sleeve.

Moreover, the invention may be carried out in a wide range of steels and alloys, provided that the material has sufficient ductility to undergo expansion. In the case of steels, the material may be a non-alloy steel, or a Mn steel, or a Cr—Mo steel, or a microalloyed steel, or a boron steel, or a combination of the aforementioned compositions (Cr—Mo—Nb—B steel), or a 13% martensitic Cr steel, or a 22 or 25% chromium austeno-ferritic duplex steel, or else an austenitic stainless steel. For example, a C—Mn steel may be used for non-corrosive wells or else a 0.2% C and 13% Cr steel (X2OCr13 according to the Euronorm standard and AISI 420 according to the American standard) for corrosive wells containing $CO_2$.

Furthermore, the material may possibly be heat-treated so as to have a yield point greater than a selected value or within a range of selected values. The minimum yield point may, for example, be selected from a range extending from 300 MPa to 1,000 MPa or more.

The invention is not limited to the methods and embodiments of sealed threaded tubular joints described above, merely by way of example, but rather encompasses all of the variations conceivable to a person skilled in the art within the following claims.

The invention claimed is:

1. An expandable tubular joint comprising:
   a first tubular element including a first portion, provided with a male thread, and
   a second portion extending said first portion and comprising
   i) a first outer surface,
   ii) a first annular lip having a first axial abutment surface and a first inner surface and delimited by said first outer surface over a portion of the axial length thereof, and
   iii) a second abutment surface; and
   a second tubular element comprising
   i) a female thread, matching the male thread and screwed thereto,
   ii) a second annular lip having a third abutment surface resting against said second abutment surface, a second outer surface, arranged to face said first inner surface, and a second inner surface,
   iii) a fourth axial abutment surface, and
   iv) a third inner surface extending between said fourth axial abutment surface and said female thread and defining with said second outer surface and fourth abutment surface an annular recess configured to receive said first lip,
   wherein said second and third abutment surfaces are conical surfaces having substantially identical angles of inclination relative to a plane transverse to a longitudinal direction, selected so as to allow said second abutment surface to rest against said third abutment surface, generating a first radial and sealing interference contact of one of said first inner and outer surfaces of the first lip against said second outer surface or said third inner surface respectively, and such that, during a diametral expansion in a plastic deformation region subsequently carried out on the expandable tubular joint, said first outer surface and said third inner surface are forced locally to define a second sealing interference contact.

2. The joint according to claim 1, wherein said conical surfaces of the second and third abutment surfaces are convex and concave respectively, so as to generate said first radial and sealing interference contact of the first inner surface against the second outer surface.

3. The joint according to claim 2, wherein said first and second lips initially have shapes selected such that said first abutment surface rests on said fourth abutment surface before said second abutment surface is pressed onto said third abutment surface.

4. The joint according to claim 1, wherein said conical surfaces of the second and third abutment surfaces are concave and convex respectively, so as to generate said first radial and sealing interference contact of the first outer surface against the third inner surface.

5. The joint according to claim 4, wherein said third inner surface of the second tubular element initially has, in the region of its connection to said fourth abutment surface, a first sealing surface generally having a selected angle of inclination relative to the longitudinal direction and in that said first tubular element initially has, in the region of its first outer surface and in the region of its connection to said first abutment surface, a second sealing surface generally having a selected angle of inclination relative to the longitudinal direction (A) in such a way that, during screwing, said first and second sealing surfaces are radially tightened against one another, generating a third sealing interference contact.

6. The joint according to claim 5, wherein said first and second sealing surfaces are arranged in such a way that said first sealing interference contact is generated between said first and second sealing surfaces after said third sealing interference contact, so as to reinforce said third sealing interference contact.

7. The joint according to either claim 5, wherein said selected angles of the first and second sealing surfaces are initially between approximately +1° and approximately +30°.

8. The joint according to claim 5, wherein at least one of said first and second sealing surfaces is a conical surface.

9. The joint according to claim 5, wherein at least one of said first and second sealing surfaces is a rounded surface.

10. The joint according to claim 9, wherein said rounded surface comprises a toric-type portion.

11. The joint according to claim 5, wherein said first sealing surface is defined by a third local annular set-back toward the interior of said third inner surface.

12. The joint according to claim 5, wherein said second sealing surface is defined by a fourth local annular set-back toward the interior of said first outer surface.

13. The joint according to claim 1, wherein said inclinations are initially between approximately +5° and approximately +30°.

14. The joint according to claim 1, wherein said first lip and said recess initially have shapes selected such that said first interference contact is not generated until said second abutment surface rests on said third abutment surface.

15. The joint according to claim 1, wherein said first abutment surface is arranged to be forced during screwing to rest against said fourth abutment surface so as to cause said first lip to be subjected to axial compression in an elastic deformation region.

16. The joint according to claim 1, wherein the second outer surface of said second lip initially has, in the region of its connection to said third abutment surface, an annular portion inclined relative to said longitudinal direction by an angle of between approximately 8° and approximately 12°.

17. The joint according to claim 1, wherein said first inner surface of the first lip is initially inclined relative to said longitudinal direction by an angle of between approximately 0.1° and approximately 15°.

18. The joint according to claim 1, wherein the ratio between an extension of the second lip in the longitudinal direction and an extension of the recess in the transverse direction is between approximately 1 and approximately 3.

19. The joint according to claim 1, wherein said male and female threads initially comprise threads provided with a carrier flank having a negative angle of between approximately −3° and approximately −15°.

20. The joint according to claim 1, wherein said male and female threads initially comprise threads provided with a stabbing flank having a positive angle of between approximately +10° and approximately +30°.

21. The joint according to claim 20, wherein said male and female threads are arranged to have, after screwing and prior to expansion, an axial clearance between their stabbing flanks of between approximately 0.05 mm and approximately 0.3 mm.

22. The joint according to claim 1, wherein said first tubular element initially has, in the region of its first outer surface and before its first portion (P1), a conical chamfer defining a first local annular set-back toward the interior of the joint.

23. The joint according to claim 22, wherein said chamfer has a slope which is substantially continuous relative to the longitudinal direction and between approximately 8° and approximately 12°.

24. The joint according to claim 1, wherein said first tubular element is provided with the second portion initially having a local annular added thickness selected in the region of a fourth inner surface extending said second abutment surface in the direction of the first portion, and said third inner surface comprises, at a selected location, a groove suitable for being arranged after screwing substantially in the region of said local added thickness and for defining in the region of the first outer surface, during the diametral expansion, an annular shoulder having at least a portion of the shape of said groove and being in sealing interference contact therewith.

25. The joint according to claim 1, wherein said first tubular element initially has in the region of its first portion, over its inner surface opposing said male thread, a conical neck in which is defined a second local annular set-back.

26. The joint according to claim 25, wherein said neck initially increases substantially continuously at a slope relative to the longitudinal direction of between approximately 2° and approximately 20°.

27. The joint according to claim 24, wherein said groove comprising at least two curvilinear portions is initially provided.

28. The joint according to claim 27, wherein said curvilinear portions initially have substantially identical radii of curvature.

29. The joint according to claim 28, wherein said radius of curvature is initially between approximately 2 mm and approximately 60 mm.

30. The joint according to claim 27, wherein the two curvilinear portions are separated by a substantially cylindrical central portion.

31. The joint according to claim 27, wherein said groove initially has a radial depth, the maximum value of which is selected such that the material section at the bottom of the groove is greater than the smallest of the critical sections of the threaded elements.

32. The joint according to claim 1, wherein said male and female threads are selected from a group consisting of conical and cylindrical threads and are each formed over at least one tubular element portion.

33. The joint according to claim 1, wherein in that said first tubular element is provided with a first rounded outer surface.

34. The joint according to claim 1, wherein said second tubular element is associated with a substantially symmetrical female/female connection sleeve and said first tubular element is associated with an end of a great length tube.

35. The joint according to claim 34, wherein said sleeve comprises a central portion extended on either side by two second tubular elements and initially provided over an outer surface with an annular zone having a reduced thickness selected such that the initial thickness of said sleeve in the region of this zone is greater than the smallest of the critical sections of the threaded elements.

36. The joint according to claim 1, wherein the second outer surface of said second lip initially has, in the region of its connection to said third abutment surface, an annular portion inclined relative to said longitudinal direction by an angle of approximately 10°.

37. The joint according to claim 1, wherein the ratio between an extension of the second lip in the longitudinal direction and an extension of the recess in the transverse direction is between approximately 1.2 and approximately 1.6.

38. The joint according to claim 1, wherein, after said diametrical expansion, the joint is sealed with respect to fluid transmission between an interior and exterior of the joint.

39. A method for producing a sealed tubular expanded joint comprising a first tubular element comprising a first portion, provided with a male thread, and a second portion extending said first portion and comprising i) a first outer surface, ii) a first annular lip having a first axial abutment surface and a first inner surface and delimited by said first outer surface over a portion of the axial length thereof, and iii) a second abutment surface; and a second tubular element comprising i) a female thread, matching the male thread and screwed thereto, ii) a second annular lip having a third abutment surface resting against said second abutment surface, a second outer surface, arranged to face said first inner surface, and a second inner surface, iii) a fourth axial abutment surface, and iv) a third inner surface extending between said fourth axial abutment surface and said female thread and defining with said second outer surface and fourth abutment surface an annular recess configured to receive said first lip, wherein said second and third abutment surfaces are conical surfaces having substantially identical angles of inclination relative to a plane transverse to a longitudinal direction, selected so as to allow said second abutment surface to rest against said third abutment surface, generating a first radial and sealing interference contact of one of said first inner and outer surfaces of the first lip against said second outer surface or said third inner surface respectively, the method comprising:

screwing said first and second tubular elements until said first lip is accommodated in said annular recess and said second abutment surface rests against said third abutment surface so as radially to tighten, in a sealed manner by forming a first radial and sealing interference contact, one of said first inner and outer surfaces of the first lip against said second outer surface or said third inner surface respectively, and subjecting said expandable tubular joint, by means of an axially displaceable expansion tool, to a diametral expansion in a plastic deformation region, so as to force said first outer surface and said third inner surface locally to define a second sealing interference contact.

40. The method according to claim 39, wherein said first and second lips, have shapes selected such that said first interference contact is established between said first inner surface and second outer surface, and said first interference contact is not established until said second abutment surface rests on said third abutment surface.

41. The method according to claim 40, wherein said screwing firstly forces said first abutment surface to be pressed against said fourth abutment surface so as to cause said first lip to be subjected to axial compression in an elastic deformation region.

42. The method according to claim 39, wherein said screwing forces first and second sealing surfaces to be radially tightened against one another, generating first a third sealing interference contact, then the first sealing interference contact, which comes to reinforce said third sealing interference contact.

43. The method according to claim 39, wherein said expansion generates a fourth sealing interference contact between a free end of the first inner surface and the second outer surface.

44. The method according to claim 39, wherein the radial expansion of the joint takes place at an expansion rate at least equal to 10%.

45. The method according to claim 39, wherein, after said diametrical expansion, the joint is sealed with respect to fluid transmission between an interior and exterior of the joint.

* * * * *